United States Patent
Kästle

(10) Patent No.: US 7,388,335 B2
(45) Date of Patent: Jun. 17, 2008

(54) APPARATUS FOR PROVIDING A SINUSOIDALLY AMPLITUDE-MODULATED OPERATING VOLTAGE, LIGHTING SYSTEM AND METHOD FOR GENERATING AN AMPLITUDE-MODULATED VOLTAGE

(75) Inventor: Herbert Kästle, Traunstein (DE)

(73) Assignee: Patent-Treuhand-Gesellschaft Für Elektrische Glühlampen mbH, Munich (DE)

( * ) Notice: Subject to any disclaimer, the term of this patent is extended or adjusted under 35 U.S.C. 154(b) by 51 days.

(21) Appl. No.: 11/455,174

(22) Filed: Jun. 19, 2006

(65) Prior Publication Data

US 2006/0284571 A1    Dec. 21, 2006

(30) Foreign Application Priority Data

Jun. 20, 2005    (DE) ................. 10 2005 028 417

(51) Int. Cl.
*H05B 37/02* (2006.01)
(52) U.S. Cl. .................... 315/209 R; 315/219; 315/224; 315/225
(58) Field of Classification Search ............. 315/209 R, 315/219, 224, 225, 291, 307
See application file for complete search history.

(56) References Cited

U.S. PATENT DOCUMENTS

| 5,952,794 | A  | * | 9/1999 | Bergman et al. | ............ 315/307 |
| 2002/0113557 | A1 | * | 8/2002 | Langeslag et al. | ........... 315/219 |
| 2003/0193302 | A1 |   | 10/2003 | Huber et al. | |

FOREIGN PATENT DOCUMENTS

DE    102 16 596 A1    11/2003

* cited by examiner

*Primary Examiner*—Tuyet Vo
(74) *Attorney, Agent, or Firm*—Carlo S. Bessone

(57) ABSTRACT

In the case of an apparatus for providing a sinusoidally amplitude-modulated operating voltage, two switches are arranged in the form of a half bridge, and an LC element is arranged downstream of the half bridge. The first switch is driven by a first square-wave signal in a clocking with the amplitude modulation frequency per clock cycle, and the second switch (QLOW) is driven by a second square-wave signal, which is shorter than the first signal, with a temporal offset with respect to the first signal in each clock cycle. The LC element (LMOD, CMOD) acts as a filter for the signal resulting from the driving of the switches at a connection point (K) between the switches and allows a DC voltage component and a sinusoidal component of the signal with the fundamental frequency of the clocking to pass through, but substantially filters out harmonics.

7 Claims, 3 Drawing Sheets

APPARATUS FOR PROVIDING A SINUSOIDALLY AMPLITUDE-MODULATED OPERATING VOLTAGE, LIGHTING SYSTEM AND METHOD FOR GENERATING AN AMPLITUDE-MODULATED VOLTAGE

TECHNICAL FIELD

The invention relates to an apparatus for providing a sinusoidally amplitude-modulated operating voltage. It also relates to a lighting system having such an apparatus and generally to a method for generating an amplitude-modulated voltage.

PRIOR ART

A sinusoidal AC operating voltage is required for operating a high-pressure discharge lamp whose operating frequency is typically (in the case of 70 W lamps) swept in the form of a sawtooth in the range of between 45 kHz and 55 kHz and usually with a 100 Hz clock cycle, depending on the geometry of the lamp burner. The sweeping operation generally prevents the excitation of acoustic resonances and therefore contributes to stabilizing the plasma arc. Furthermore, the selection of a suitable sweep window by targeted excitation of suitable transverse resonances straightens the discharge arc, in particular during horizontal operation.

At the same time as the frequency modulation, the AC operating voltage should be amplitude-modulated. It should be possible to set the modulation both in terms of the frequency of between 20 kHz and 50 kHz (typically in the case of a 70 W lamp from 23 kHz to 30 kHz, in the case of a 150 W lamp from 20 kHz to 25 kHz, in the case of a 35 W lamp from 34 kHz to 40 kHz) and in terms of the modulation depth (typically of 10% to 40%), corresponding to the geometry of the lamp burner. The amplitude modulation is used for targeted excitation of a specific longitudinal acoustic resonance in the plasma arc in the lamp. This longitudinal mode leaves the arcing response of the arc (arc stability) unimpaired, but instead brings about increased mixing of the gas components in the arcing area (so-called color mixing). The prevention of the so-called segregation owing to the amplitude modulation therefore results in a more homogeneous luminance along the plasma arc and also in a considerable increase in the luminous efficiency.

In the prior art, half-bridge inverters are often used for coupling the lamp to an electronic ballast at these operating frequencies. In order to realize the amplitude modulation of the lamp supply voltage or the supply current, in the prior art the modulation is impressed on the supply voltage of the half bridge via a separate preliminary stage.

For example, DE 102 16 596 A1 has disclosed the use of a step-down converter, which realizes a clocked DC voltage source.

The implementation of the amplitude modulation disclosed in DE 102 16 596 A1 with the aid of a step-down converter has the disadvantage that in particular the amplitude modulation depth can only be readjusted within narrow limits since it is not completely and exclusively dependent on the state of an individual control signal but is also dependent on the load response of the load or the lamp. Owing to ageing effects in the lamp or as a result of changed lamp properties during dimming operation, it is necessary for the amplitude modulation to be variable over a wide range.

SUMMARY OF THE INVENTION

One object of the invention is to provide an apparatus for providing a sinusoidally amplitude-modulated operating voltage which makes it possible for the modulation depth to be continuously adjusted, as desired.

The apparatus according to the invention, which is used in particular for feeding a half-bridge inverter with a high-pressure discharge lamp coupled thereto, has two switches arranged in the form of a half bridge and an LC element which is arranged downstream of the half bridge. A first switch of the half bridge is driven by a first signal in a clocking with the amplitude modulation frequency per clock cycle, and a second switch is driven by a second signal, which is shorter than the first signal, with a temporal offset with respect to the first signal in each clock cycle. The signal resulting at a connection point between the switches in the switch half bridge is filtered by the downstream LC element in the invention such that the LC element allows a DC voltage component and a sinusoidal component of the signal with the fundamental frequency of the clocking to pass through and (substantially) filters out harmonics, i.e. higher harmonics than the fundamental frequency.

The use of an asymmetrically driven half bridge has the advantage over the step-down converter from the prior art that, as a result of the second switch, there is a greater degree of freedom with which the resulting AM can be influenced, either by varying the duty cycle or by varying the active time of only one of the two switches.

The modulation depth can be set to be any desired depth and continuously, in particular by varying the second, shorter signal (whilst maintaining the so-called blankout time).

In accordance with one preferred embodiment, the drive signals are square-wave signals.

The modulator half bridge is in this case supplied with a DC voltage.

In accordance with the preferred embodiment, the duration and temporal offset of the switching signals should be dimensioned such that a square-wave signal with the amplitude of the DC voltage results at the connection point between the switches in each clock cycle, the period of said square-wave signal precisely corresponding to the rate of repetition of the switching control signals and its duty cycle being determined by the selected switching lengths of the two switches.

If the square-wave signal were to have a duty cycle of precisely 50% given absolutely symmetrical driving of the two switches, after filtering by the LC element (corresponding to its Fourier spectrum) a DC voltage component of U0/2 and a high or maximum fundamental component of the present switching frequency would result.

If the high (active) part of the square-wave signal were to be shorter than half the clock cycle (duty cycle <50%), a DC voltage component which is less than U0/2 would result, and the absolute value of the fundamental component would also be reduced.

If the high (active) part of the square-wave signal is longer than half the clock cycle (duty cycle >50%), a DC voltage component which is greater than U0/2 would result, and the absolute value of the fundamental component would also be reduced.

That part of the square-wave signal which is active in the preferred embodiment is generally dimensioned so as to be longer than half the clock cycle in order that a substantial DC voltage component is still available for feeding the high-pressure discharge lamp.

In the present case, in accordance with the invention the square-wave signal can be dimensioned as regards its duty cycle such that the absolute value of the fundamental after the LC filter results in the desired modulation depth and such that a sufficiently high DC voltage component is generated for feeding the inverter for the high-pressure discharge lamp.

Since the two parameters are not independent of one another, it is generally necessary for the desired DC voltage component to be corrected above the level of the feeding supply voltage Uo in order that the desired output power towards the lamp is still ensured (lamp power regulation).

Typical values in the case of amplitude modulation frequencies of between 23 kHz and 28 kHz are 25 µs to 40 µs, in this case preferably 30 µs to 35 µs, for the active part of the square-wave signal and 1 µs to 15 µs, in this case preferably 1 µs to 5 µs, for the inactive part of the square-wave signal. The variation of the inactive part of the square-wave signal between 1 µs and 15 µs results in a severe variation of the amplitude modulation depth, which may be 10% up to 40%, depending on the characteristic of the LC filter.

The abovementioned advantage that the variation of the second signal ensures that the modulation depth can be adjusted easily and continuously in accordance with the invention can be used for creating a control loop for the purpose of correcting the modulation depth.

For this purpose, the amplitude-modulated operating voltage needs to be tapped off and measured and compared with a desired value. In the event of a discrepancy between this operating voltage and the desired value, the amplitude modulation depth needs to be corrected, which can be realized in a simple manner by varying the switching length of the second switch.

The regulation according to the invention may be as follows:

The tapped-off operating voltage is firstly filtered, which provides the monitor value for the average voltage level.

In addition, the tapped-off operating voltage is subjected to a differentiating peak value detector, which outputs the voltage variations, which corresponds to the monitor value for the absolute modulation.

It is now possible to determine the actually present modulation depth from the two monitor values by means of division. This measured value for the modulation depth can now be compared with a desired value and, on the basis of regulating parameters which are suitably selected as regards dynamics, the amplitude modulation depth can be corrected by varying the switching state of the second lower switch.

One preferred embodiment for regulating the modulation depth is for the monitor value for the average voltage at the output of the smoothing element to be multiplied directly by double the desired value input for the desired modulation depth. The multiplied signal and the voltage variation are fed to a regulator, which outputs a regulating signal. As will be shown further below, the multiplied variable is, in the ideal case, equal to the desired value of the absolute voltage variation, with the result that the present regulation discrepancy can be determined using this regulator and then an appropriate regulating signal is generated.

The generation of the two switch signals in a pulse-width modulation module may specifically be such that the first signal is generated directly and a sawtooth voltage signal, which is synchronized with the first signal, is provided for the purpose of generating the second signal, synchronized in this case being understood to mean that the sawtooth occurs in the clock cycle when the square-wave signal forming the first signal has become zero. The sawtooth voltage signal is fed to a comparator which, if necessary, outputs a square-wave signal. The square-wave signal is then set to zero if the sawtooth voltage exceeds a specific threshold value predetermined by the regulating signal.

If the regulating signal is high, there is a high demand for modulation depth, the switching threshold is accordingly exceeded at a later point in time and the pulse duration of the second lower switch is accordingly longer.

If the regulating signal is low, there is a low demand for modulation depth, the switching threshold is accordingly exceeded at an earlier point in time and the pulse duration of the second lower switch is accordingly shorter.

A particularly simple type of control is involved using the regulating signal, the level of the regulating signal being particularly directly related to the length of the square-wave signal, which in turn determines a duty cycle of that signal, which is output by the half bridge and correspondingly defines the depth of the amplitude modulation downstream of the LC element.

The invention also relates to a lighting system which, to a certain extent, comprises the apparatus according to the invention as a ballast, to the abovementioned inverter (i.e. half-bridge inverter, for example), which is fed by the amplitude-modulated operating voltage and has output terminals to which a lamp voltage is applied, and to a high-pressure discharge lamp, which is coupled to the output terminals.

The invention also includes a method for generating an amplitude-modulated voltage, in particular as the operating voltage for feeding an inverter in a lighting system having a high-pressure discharge lamp. The method comprises the fact that a) in a first step a clocked square-wave signal is generated by appropriately (suitably) driving two switches arranged in the form of a half bridge, said square-wave signal lasting longer than half the clock cycle, and the fact that b) in a second step the clocked square-wave signal is subjected to a filter which allows a DC voltage component and a sinusoidal voltage component, which is clocked with the fundamental frequency, to pass through, but filters out harmonics of the fundamental frequency.

BRIEF DESCRIPTION OF THE DRAWINGS

The invention will be explained in more detail below with reference to a plurality of exemplary embodiments. In the drawings.

PREFERRED EMBODIMENT OF THE INVENTION

Figure 1:
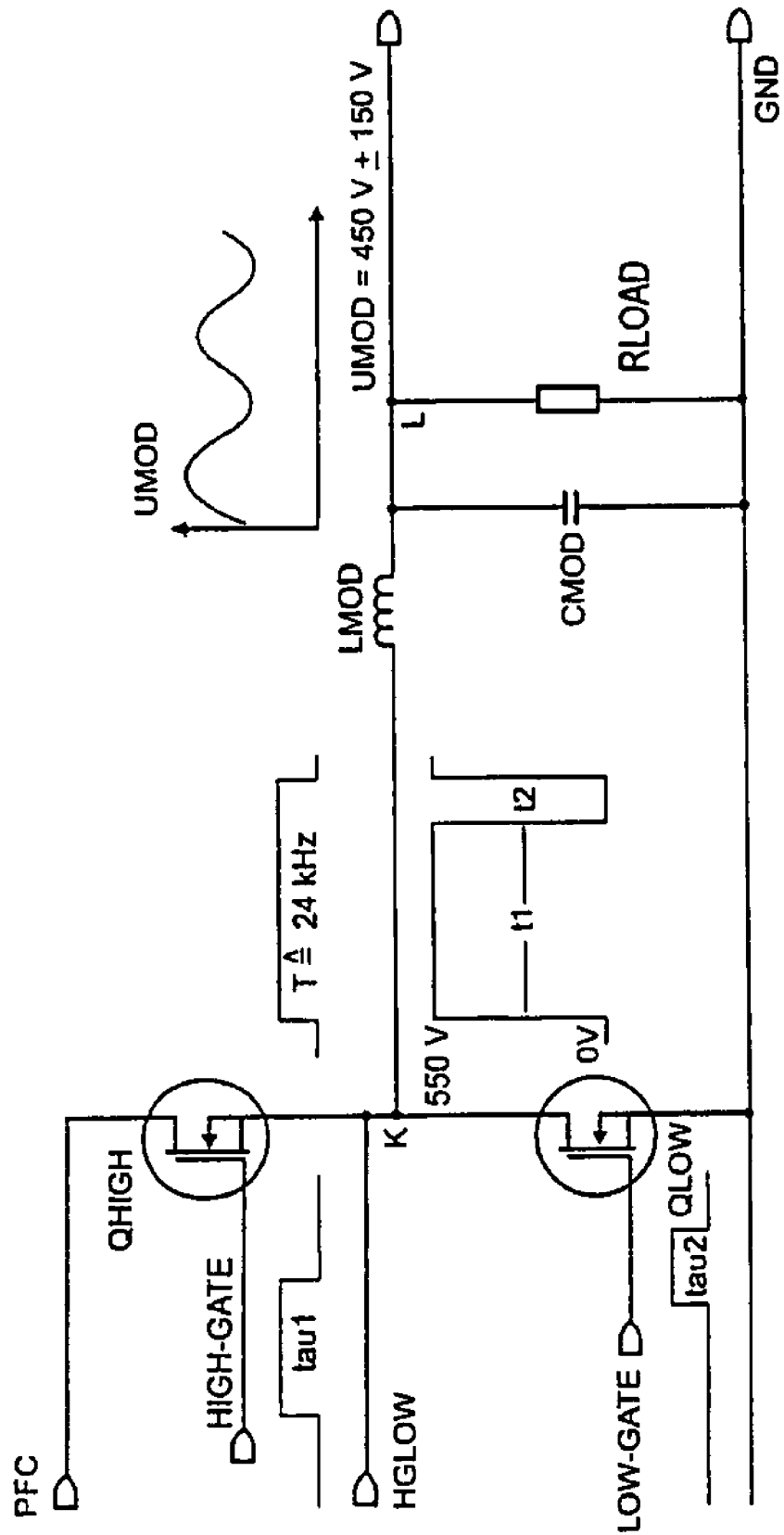
FIG. 1 shows a circuit diagram of the apparatus according to the invention, the components used for driving purposes being omitted.

The apparatus shown in FIG. 1 comprises, as essential components, two switches QHIGH and QLOW arranged in the form of a half bridge (both switches are MOSFETs) and an LC element arranged downstream of the half bridge comprising the inductance LMOD and the capacitance CMOD.

The half bridge is fed a DC voltage U0 of 550 VDC, which, as shown in FIG. 1, originates from a PFC stage (Power Factor Controller) i.e. a stage which forms the transition between the power supply system and an electronic ballast for a high-pressure discharge lamp. During a clock cycle of 24 kHz illustrated between the components in this case for explanatory purposes, the first switch on the drive line HIGH-GATE is driven by a square-wave voltage having the length tau1 equal to 30 μs. In the clock cycle after the square-wave pulse of the duration tau1, a square-wave pulse of the duration tau2 follows on the drive line LOW-GATE for the second switch QLOW. A typical duration value for tau2 is 1.8 μs. The square-wave pulse with the duration tau2 should directly follow the square-wave pulse with the duration tau1 whilst maintaining a typical dead time of 0.5 μs to 1 μs. The clock cycle of the total cycle is 24 kHz.

Owing to the half-bridge arrangement, the two switches QHIGH and QLOW have a connection point K, at which the signal shown on the right-hand side in FIG. 1 results. During the clock cycle with the duration T, the voltage at point K rises from 0 V to 550 V over a duration t1>=tau1 and then falls to 0 V for a duration t2>=tau2. Subsequently, the clock cycle begins from scratch, i.e. the voltage rises and falls once again. The ratio t1/t2 defines the duty cycle at point K. The durations t1 and t2 are essentially defined by the temporal position of the falling edges of the square-wave pulses with tau1 and tau2. During the clock cycle with the duration T, the voltage initially remains at 550 V from the beginning on and then falls to a value of 0 V after the end of the pulse with the duration tau1 at the same time as the falling edge of this pulse, i.e. the time t1 is canceled. Only from now on can the pulse tau2 begin once a small dead time (typical value in the case of half bridges=0.5 μsec) has been maintained.

During the square-wave pulse with the duration tau2, the voltage at the point K remains at 0 V. It rises again to a value of 550 V only after the end of the pulse with the duration tau2 with its falling edge, irrespective of whether the pulse has already begun from the beginning again at the first switch QHIGH.

It is therefore the duration tau2 which essentially determines t2, these times not necessarily being the same but being close to one another when the duration tau2 begins directly once the time tau1 has expired. As a result of the fact that tau2 is considerably smaller than tau1, t2 is considerably smaller than t1. The signal therefore equals a DC voltage of 550 V over the duration t1 with a short dip to 0 thereafter. In the case of filtering, as takes place in this case by means of the LC element comprising the inductance LMOD and the capacitance CMOD, in the case of an applied load RLOAD (impedance of the half-bridge stage for operating the lamp), the voltage UMOD shown at the top right in FIG. 1, i.e. an amplitude-modulated voltage having a DC voltage component of less than 550 V (typically of 450 V) and a modulation depth shown here of 10 to 50% results at point L.

Mention will once again be made here of the fact that the LC element only allows the DC frequency component and the fundamental frequency of 24 kHz to pass through, but filters out higher harmonics. Of course any higher harmonics which are largely filtered out are hidden in the square-wave signal at the connection point K.

Until now, details have only been given of the basic concept of the apparatus for providing a sinusoidally amplitude-modulated operating voltage. In the text which follows consideration is given to how the driving takes place, in particular its regulation.

Figure 2:
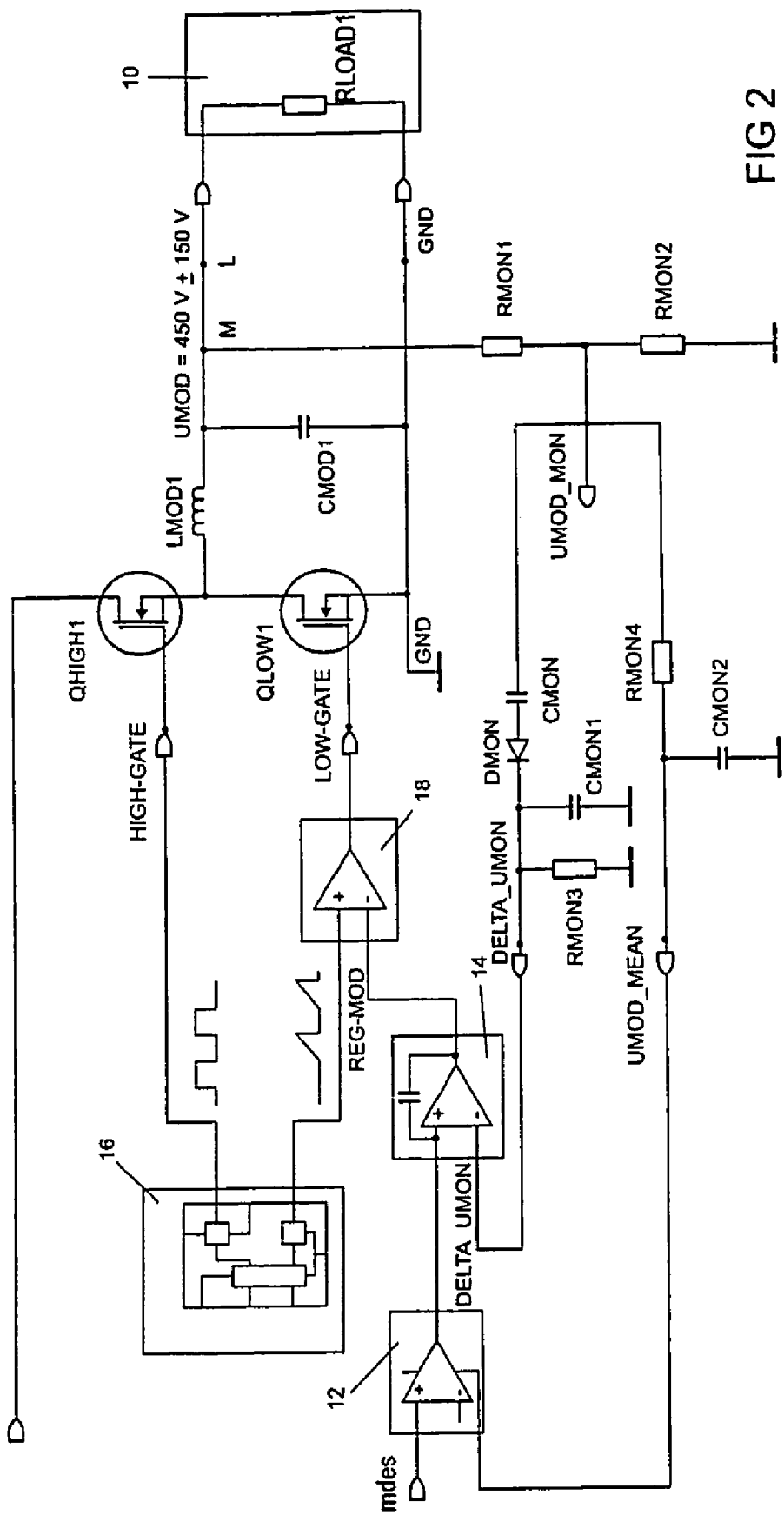
FIG. 2 shows a completely regulated, analog embodiment of the present invention.

FIG. 2 shows an apparatus for providing a regulated sinusoidal amplitude-modulated operating voltage in accordance with a first exemplary embodiment having a symbolically provided load, namely the lamp inverter 10, for example a half-bridge inverter with the high-pressure discharge lamp, as is known from the prior art. Upstream of point L, the voltage UMOD is tapped off at point M via a voltage divider comprising the resistors RMON1 and RMON2, i.e. UMOD-_MON. The mean value UMOD_MEAN is determined via an RC smoothing element comprising the resistor and the capacitance CMON2. At the same time, the voltage variation DELTA_UMON is determined via a capacitively coupled peak value detector DMON in the other, upper (in FIG. 2) branch.

The measured value for the instantaneous degree of modulation results from $$m=(U\text{max}-U\text{min})/(U\text{max}+U\text{min})=\text{DELTA\_UMON}/2\times UMOD\_\text{MEAN}.$$

The regulation should now appropriately increase or decrease the pulse duration tau2, corresponding to a desired value input $m_{des}$, using an amplitude modulator described with reference to FIG. 1 until the measured modulation depth corresponds to the desired value input.

In order to avoid division, the desired value $m_{des}$ is multiplied by the mean value UMOD_MEAN by (multiplier 12), the multiplication in this case being realized with a variable amplifier stage. The multiplication value from the multiplier 12 is then doubled again and compared with DELTA_UMON at a regulator 14.

For this purpose, the value for DELTA_UMON and the value output from the multiplier 12 are fed to a regulator 14 having an error amplifier. The regulator 14 outputs a regulating signal REG_MOD whilst taking into account suitable regulating dynamics parameters.

The circuit described with reference to FIG. 1 is now driven by a clock generator 16, which outputs a square-wave signal on one line and a sawtooth signal, which is synchronized with said square-wave signal, on another line. The square-wave signal is directly the signal which is output on the line HIGH-GATE for the first switch QHIGH.

The sawtooth voltage itself is fed to a comparator as the pulse-width modulation module 18, the regulating signal REG-MOD being on the second input of said pulse-width modulation module 18 as a threshold reference value for the comparator.

If the demand for AM depth is high, the REG_MOD signal as the threshold value is high, and the sawtooth exceeds the threshold at a later point in time, as a result of which the pulse duration from the PWM module is extended.

If the demand for AM depth is low, the REG_MOD signal as a threshold value is low, and the sawtooth exceeds the threshold at an earlier point in time, as a result of which the pulse duration from the PWM module is shortened.

In order to determine the duration tau2, the signal REG-_MOD acts as the signal giving the threshold value. The higher REG_MOD is, the longer tau2 is.

The signal from the pulse-width modulation module 18 can be given directly on the line LOW-GATE and is a square-wave signal with the duration tau2.

Owing to the described feedback of the voltage UMOD and the comparison of the actual value and the desired value for the voltage variation in the regulator 14, suitable driving is obtained by means of the signal REG_MOD for the purpose of directly fixing the duration tau2.

As a result, a closed control loop is achieved for correcting and stabilizing the amplitude modulation depth.

Figure 3:
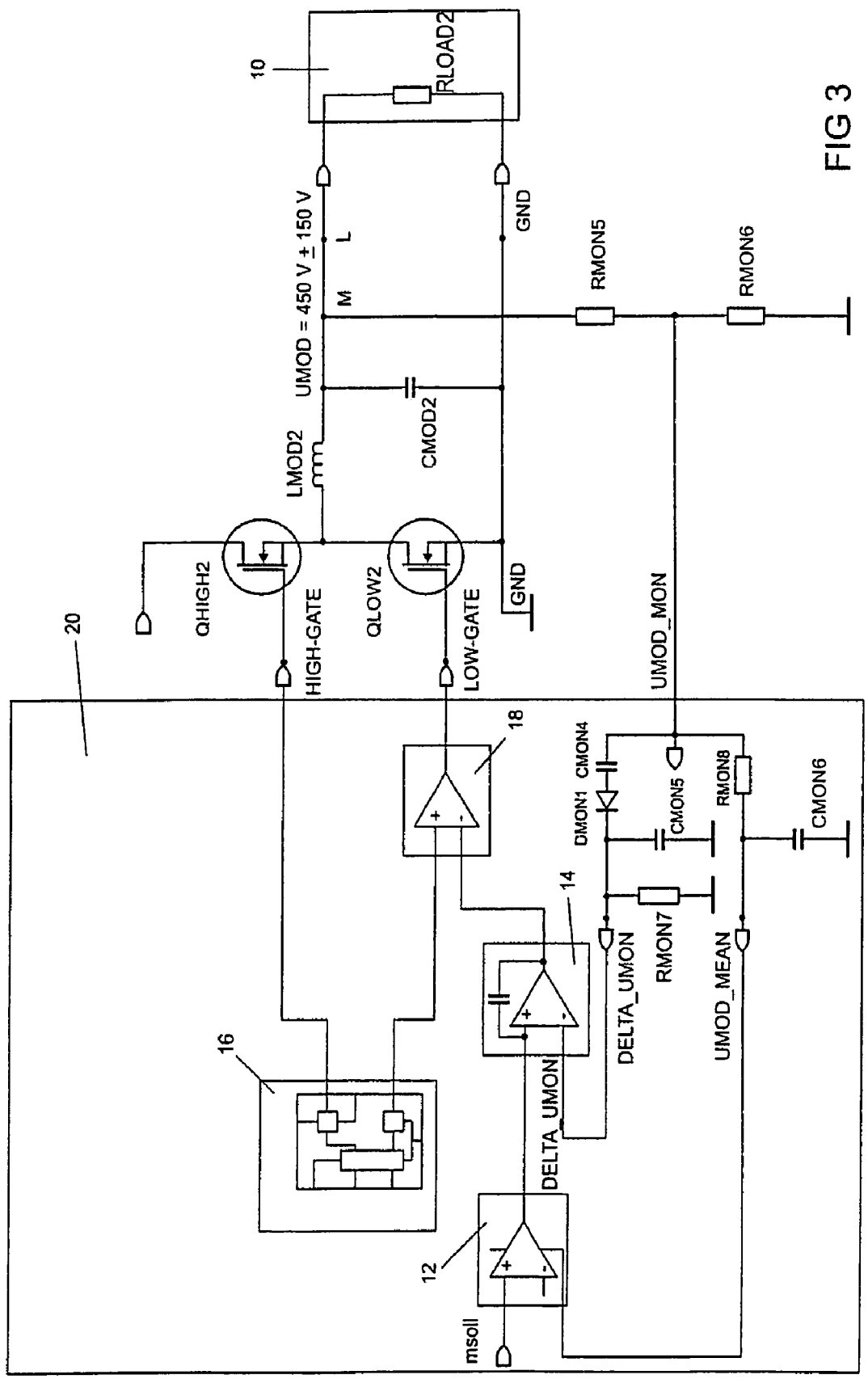
FIG. 3 shows a completely regulated digital embodiment of the present invention.

The analog control loop described until now can also be realized via a microprocessor. FIG. 3 shows a digital embodiment of the apparatus according to the invention. In this case, the same components are shown as in FIG. 2, only the functions of determining the mean voltage UMOD_MIN and DELTA_UMON and multiplication, regulation, pulse-width modulation and outputting of a clock cycle are assigned to a microprocessor 20. The symbolic illustration of the analog components in this case means that the microprocessor 20 assumes the corresponding algorithms. The microprocessor 20 only receives the tapped-off UMOD_MON and outputs square-wave pulses with the durations tau1 and tau2 on the lines HIGH-GATE and LOW-GATE, respectively. In the embodiment shown in FIG. 3, only a voltage divider and a microprocessor are now provided for generating the gate signals, in comparison with the components in FIG. 1.

The invention claimed is:

1. An apparatus for providing a sinusoidally amplitude-modulated operating voltage, in particular for feeding a half-bridge inverter (10) having a high-pressure discharge lamp coupled thereto, having two switches (QHIGH and QLOW) arranged in the form of a half bridge, of which a first switch (QHIGH) is driven by a first signal in a clocking with the amplitude modulation frequency per clock cycle and a second switch (QLOW) is driven by a second signal, which is shorter than the first signal, with a temporal offset with respect to the first signal in each clock cycle, and having an LC element (LMOD, CMOD), which is arranged downstream of the half bridge, acts as a filter for the signal resulting from the driving of the switches at a connection point (K) between the switches, allows a DC voltage component and a sinusoidal component of the signal with the fundamental frequency of the clocking to pass through and substantially filters out harmonics.

2. The apparatus as claimed in claim 1, characterized in that the drive signals are square-wave signals such that, when the half bridge is fed a DC voltage, a square-wave signal having the amplitude of the DC voltage results at the connection point (K) between the switches in each clock cycle, said square-wave signal lasting for longer than half the clock cycle.

3. The apparatus as claimed in claim 2, characterized in that the amplitude modulation frequency is between 23 kHz and 28 kHz, the first square-wave signal is between 25 μs and 40 μs and preferably between 30 μs and 35 μs long, and the second square-wave signal is between 1 μs and 15 μs, preferably between 1 μs and 5 μs long.

4. The apparatus as claimed in claim 1, characterized in that the amplitude-modulated operating voltage (UMOD) is tapped off and is used for regulating the duration of the second signal, the regulation being carried out in analog fashion (12, 14, 16, 18) or by means of a microprocessor (20).

5. The apparatus as claimed in claim 4, characterized in that the tapped-off operating voltage (UMOD_MON) is, on the one hand, subjected to a filter (RMON4, CMON2), which outputs the averaged voltage level which is multiplied in a multiplier (12) by double the desired value ($m_{des}$) for the degree of modulation, and in that the tapped-off operating voltage, on the other hand, is subjected to a peak value detector (DMON), which outputs the voltage variation (DELTA_UMON), and the multiplied signal and the voltage variation (DELTA_UMON) being fed to a regulator (14) which outputs a regulating signal (REG_MOD).

6. The apparatus as claimed in claim 5, characterized in that the regulating signal is fed to a pulse-width modulation module (18), to which, at another input, a sawtooth voltage signal, which is synchronized with the first signal, is fed, the pulse-width modulation module outputting the second signal as a square-wave signal, whose length is dependent on the regulating signal.

7. A lighting system having: an apparatus for providing an amplitude-modulated operating voltage as claimed in one of the preceding claims, an inverter (10), which is fed by the amplitude-modulated operating voltage and has output terminals, to which a lamp voltage is applied, and a high-pressure discharge lamp which is coupled to the output terminals.

* * * * *